(12) United States Patent
Gasbarro

(10) Patent No.: US 8,187,060 B1
(45) Date of Patent: May 29, 2012

(54) APPARATUS FOR SKINNING POULTRY PRODUCTS

(75) Inventor: Geno N. Gasbarro, Columbus, OH (US)

(73) Assignee: Remington Holdings, LLC, Columbus, OH (US)

(*) Notice: Subject to any disclaimer, the term of this patent is extended or adjusted under 35 U.S.C. 154(b) by 0 days.

(21) Appl. No.: 13/109,107

(22) Filed: May 17, 2011

(51) Int. Cl.
A22B 5/16 (2006.01)
(52) U.S. Cl. .................. 452/130; 425/125; 425/129
(58) Field of Classification Search .......... 452/125, 452/127, 129, 130
See application file for complete search history.

(56) References Cited

U.S. PATENT DOCUMENTS

| | | | | |
|---|---|---|---|---|
| 3,769,903 A | * | 11/1973 | Greider | 452/127 |
| 4,292,710 A | * | 10/1981 | Townsend | 452/127 |
| 4,466,344 A | * | 8/1984 | Schill | 452/127 |
| 5,236,323 A | * | 8/1993 | Long et al. | 452/127 |
| 5,399,118 A | * | 3/1995 | Long et al. | 452/127 |
| 5,503,593 A | * | 4/1996 | Schill | 452/127 |
| 5,533,927 A | * | 7/1996 | Schill | 452/127 |
| 5,609,519 A | * | 3/1997 | Townsend | 452/127 |
| 5,779,531 A | * | 7/1998 | Braeger et al. | 452/127 |
| 6,086,470 A | * | 7/2000 | Ranniger | 452/127 |
| 6,264,542 B1 | | 7/2001 | Gasbarro | |
| 6,699,116 B1 | * | 3/2004 | Gasbarro | 452/140 |
| 7,128,642 B1 | * | 10/2006 | Veldkamp et al. | 452/129 |

* cited by examiner

Primary Examiner — David Parsley
(74) Attorney, Agent, or Firm — Jason H. Foster; Kremblas & Foster

(57) ABSTRACT

A poultry skinner including a conveyor having ribs aligned to engage the upper surface of a poultry product. A rotatably mounted gripper has a plurality of radially extending fins adapted to engage the lower surface of the poultry passing between the gripper and the conveyor. An arcuate surface is mounted in closely spaced relationship to the arcuate path traveled by the rotating gripper fins and defines an opening for trapping the skin attached to the poultry product. The skin is trapped between the arcuate surface and the outer end of a rotating fin to pull the skin from the poultry product. A rotatably mounted cleaning roller having a plurality of fins is positioned in a close clearance relationship with the gripper. The rapidly rotating fins of the cleaning roller strip the poultry skin from the fins of the gripper and eject it into a collection bin below.

5 Claims, 3 Drawing Sheets

APPARATUS FOR SKINNING POULTRY PRODUCTS

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

This invention relates generally to skinning devices, and more particularly to a device for removing the skin from pieces of poultry carcasses.

It is known in the art that there is a need for efficient and safe machines to process meats, and poultry in particular. U.S. Pat. No. 6,264,542 to Gasbarro, which is incorporated herein by reference, was a substantial advance in the technology relating to the skinning of poultry using machinery. This patent teaches a device that avoids the danger to humans of hand-skinning, and provides continuous, consistent results. Although this patent teaches a machine with many advantages, further refinement of the conventional technology is desired. Therefore, there is a need for an improved poultry skinning machine.

BRIEF SUMMARY OF THE INVENTION

The invention contemplates an improved automated poultry product skinning apparatus. The apparatus includes a support frame provided with a product feed inlet and a product discharge outlet. A conveyor is mounted to the support frame and is aligned to engage the upper surface of a piece of poultry product delivered to the feed inlet and direct the poultry product in a path toward the discharge outlet. The conveyor is mounted to the frame for selected vertical movement of at least a forward end of the conveyor in response to the size of the poultry product delivered to the feed inlet.

A gripper is rotatably mounted to the frame and has a plurality of radially extending fins with outer ends disposed below the conveyor for engaging a lower side of the poultry product passing between the gripper and the conveyor. A pinch block is mounted on the frame and includes an arcuate surface positioned in a close clearance relationship to an arcuate path of the outer end of the fins during a portion of their rotation to define an opening configured to engage the outer skin attached to the poultry product between the outer ends of the fins and the arcuate surface of the pinch block. The close clearance relationship and the opening are configured to firmly entrap the attached outer skin between the outer end of each of the fins and the arcuate surface of the pinch block to pull the outer skin from its attachment to the underlying meat portions of the poultry product.

An improvement lies in a cleaning roller that is rotatably mounted to the frame of the skinning apparatus adjacent the gripper. The cleaning roller has a plurality of radially extending fins with ends that are disposed in a close clearance relationship to the ends of the fins of the gripper. During operation of the skinning apparatus, the rapidly rotating fins of the cleaning roller strip poultry skin from the gripper and eject the skin downwardly into a collection bin. By performing this primary cleaning function, the cleaning roller allows the gripper to operate cleanly and efficiently with a significantly reduced need for additional spray water cleaning as compared to previous embodiments of the skinning apparatus.

An alternative embodiment of the improved skinning apparatus is contemplated in which the cleaning roller is rotatably mounted to an adjustment bracket that is pivotably mounted at one end to the frame of the skinning apparatus. An adjustment cam is rotatably mounted to the frame below the opposite end of the adjustment bracket and engages the adjustment bracket. By rotating the adjustment cam, the adjustment bracket and the cleaning roller can be moved incrementally nearer to the gripper. Thus, as the fins of the gripper accumulate wear and shorten over time, the close clearance relationship between the fins of the cleaning roller and the fins of the gripper can be maintained by periodic, incremental rotation of the adjustment cam.

Another alternative embodiment of the improved skinning apparatus is contemplated in which the gripper has a series of longitudinally-spaced, annular grooves formed in it and the cleaning roller has a series of radially and longitudinally-spaced teeth projecting from each of its fins. During operation of the skinning apparatus, the teeth of the cleaning roller extend into and rotate through the grooves in the gripper. The teeth of the cleaning roller thereby dig and pull substantially all skin and waste matter from the fins of the gripper. This allows the skinning apparatus to be operated without requiring any additional cleaning means such as pressurized water spray.

Figure 1:
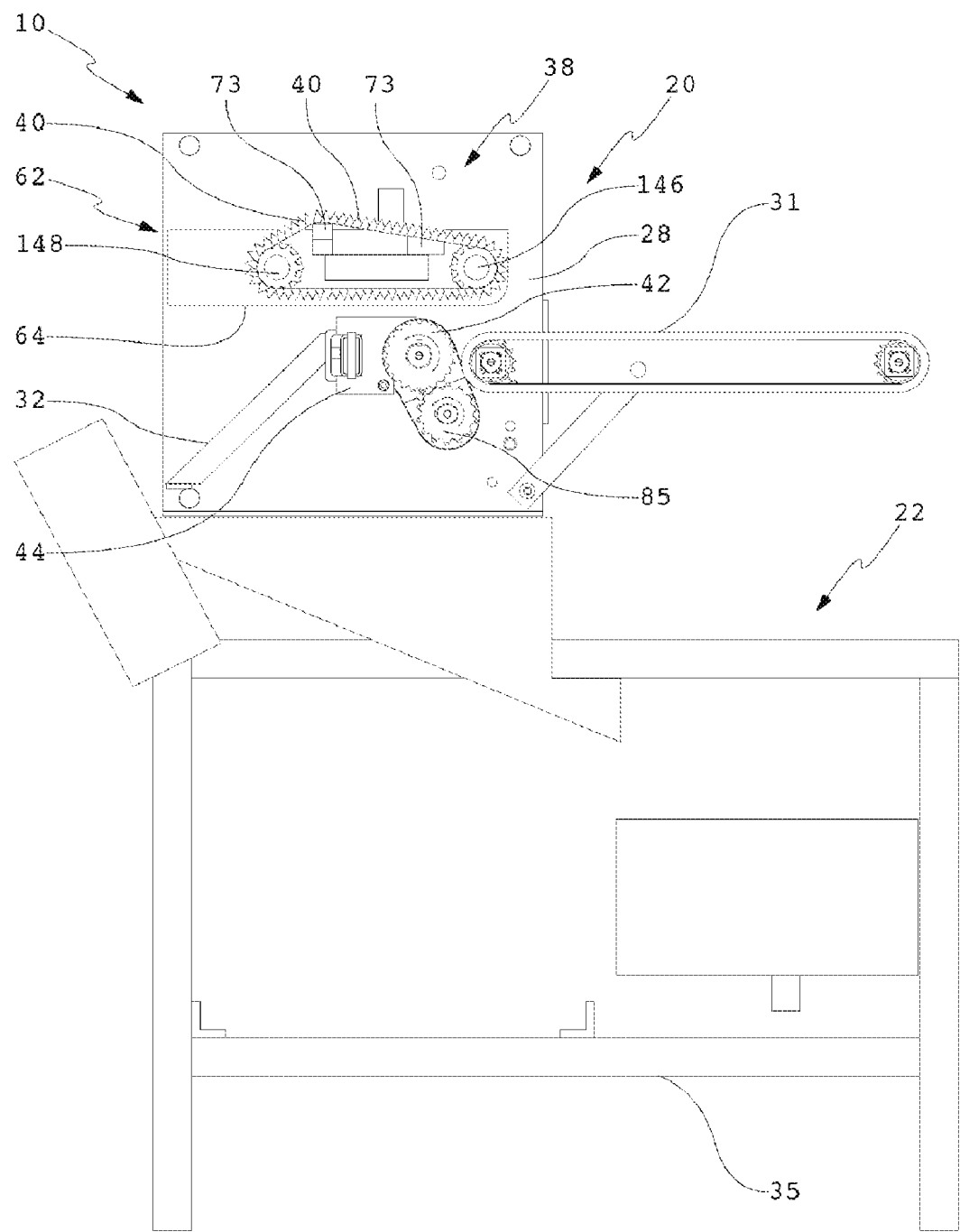
FIG. 1 is a cutaway side view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

An apparatus constructed for skinning pieces of poultry product is illustrated and described in U.S. Pat. No. 6,264,542 to Gasbarro, and is incorporated herein by reference. FIG. 1 shows a skinning apparatus 10 having a supporting frame 20, which can be mounted on a base or table 22, for conveniently locating the apparatus and the auxiliary product and skin collection means where desired.

Figure 2:
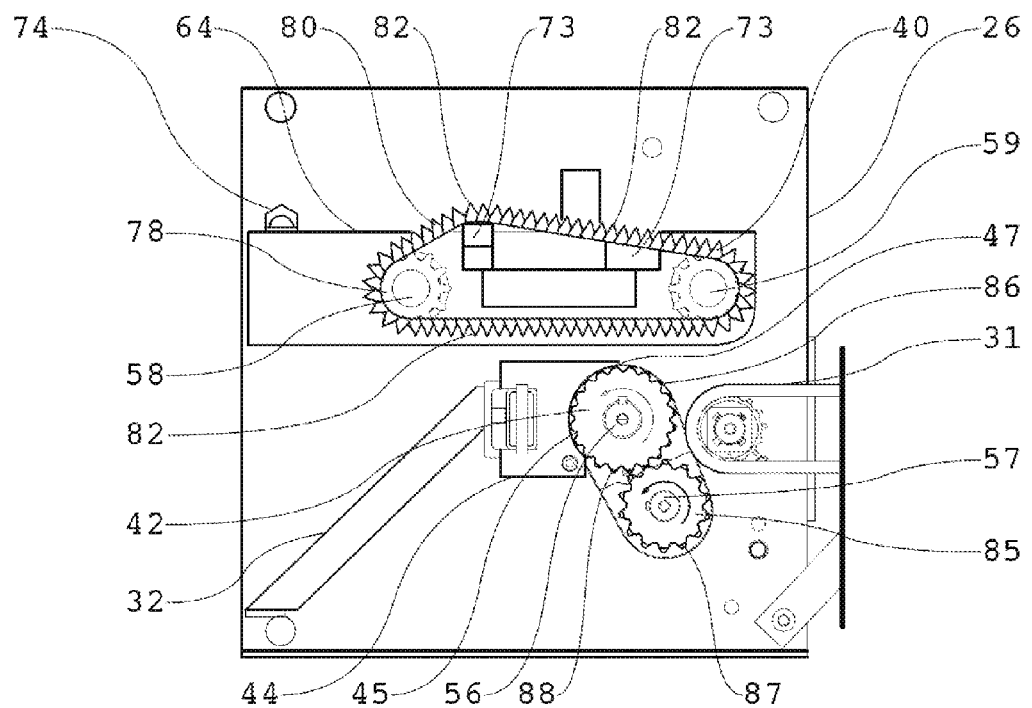
FIG. 2 is a cutaway enlarged side view illustrating the embodiment of FIG. 1.

Referring to FIGS. 1 and 2, the support frame 20 has a first sidewall (not shown in FIG. 2) and a second sidewall 26. The sidewalls are mounted to the base 22 in any conventional manner well-known to those of ordinary skill in the art, such as by welding or bolt fasteners. The bottom of the frame 20 is open to communicate with a chute for receiving the skin portion removed from the poultry product sections and directing them to a collection area, such as a bin.

A rear discharge opening in the frame 20 includes a ramp-like structure 32 that directs the product after it has been skinned to a collection area, which is separate from the removed skin, via a chute. The separate collection area for the skinned product may be a conventional bin or a conveyor (not shown), and may be located in the area 35.

The frame 20 includes a frontal opening between the sidewalls which forms a product feed inlet 28. A conventional endless belt conveyor 31 may be employed to load product and carry it to the feed inlet 28 where it is delivered to a skinning station, indicated in FIG. 1 generally at 38. However, other forms of conveying the product to the feed inlet 28 may be employed to deliver the product to the skinning station 38 without departing from the present invention.

The belt 40 is mounted on a support block 64 and is driven by a motor to rotate in a clockwise direction in the orientation shown in FIG. 1. The support block 64 is mounted to the sidewall 26 in a vertically movable relationship, thereby permitting the gap between the lower run of the belt 40 and the gripper 42 (described below) to automatically adjust to the size of poultry sections received therebetween. This can be accomplished, for example, by a pivot at the leftward end of the support block 64 about which the support block 64 pivots, or a plurality of vertical bearing rods extending through the support block 64, permitting vertical movement. The driven shaft 58 preferably forms a pivot axis for the support block 64. The combined weight of the support block 64 and its attached structures biases the block downwardly toward the gripper 42 at its rightward end as shown in FIG. 1. Thus, poultry sections placed on the conveyor 31 and conveyed to between the belt 40 and the gripper 42 cause the support block 64 to adjust upwardly to the size of the sections to be skinned, and yet the support block 64 maintains a substantially constant downward force on the poultry section during the skin removal operation.

The belt 40 transports pieces of poultry section entering the feed inlet 28 to the gripper 42, and over the gripper 42. The gripper 42 is rotatably mounted to the frame 20 and is driven by a conventional motor to rotate in a counterclockwise direction (in the FIG. 1 illustration) so that the top of the gripper 42 moves in the same direction as the lower run of the belt 40. The belt 40 and the gripper 42 cooperatively move the poultry sections toward the discharge opening, and function in cooperation with the pinch block 44 to engage and pull the outer skin off the poultry sections as described in detail below.

The belt 40, conveyor 31, gripper 42, cleaning roller 85 (described below) and other moving parts of the apparatus are driven by one or more conventional electric motors (not shown) and a conventional series of sprockets and drive chains. The belt 40 is mounted in the apparatus in a manner similar to the chain belt (also called "sticker chain") described in U.S. Pat. No. 6,264,542, referenced above. The belt 40 is formed from a plurality of pivotably-linked metal pieces extending in an endless loop around the driven and idler shafts 58 and 59. The belt 40 can be formed entirely from flexible material, such as food grade urethane, or can be formed from a flexible membrane to which rigid ribs are fastened, such as by adhesive. The ribs of the belt enable the belt 40 to drive the poultry sections coming into contact with the belt 40 in the desired direction. The relative spacing of each of the ribs can be varied to provide sufficient grip for many poultry types.

The support block 64 upon which the belt 40 is mounted functions essentially the same as described in U.S. Pat. No. 6,264,542. Thus, when a poultry section enters the feed inlet 28 and is carried over the gripper 42, product larger than the defined space will cause the forward end of support block 64 to move upward about the pivot point of the drive shaft 58 and carry with it the forward end of the belt 40 that is operatively mounted thereon as described above. A stop is preferably employed to limit the downward movement of the forward end of the support block 64.

The gripper 42 comprises a generally cylindrical member provided with a plurality of raised projections or fins 86. Preferably, the fins 86 are formed by creating axially aligned V-shaped recesses or voids in the outer cylindrical surface of a cylindrical body to leave an essentially flat surface 88 at the outer end of each fin 86. A central bore is provided in the gripper 42 to fixedly receive the drive shaft 56, which is rotatably mounted through the sidewall 26.

Figure 3:
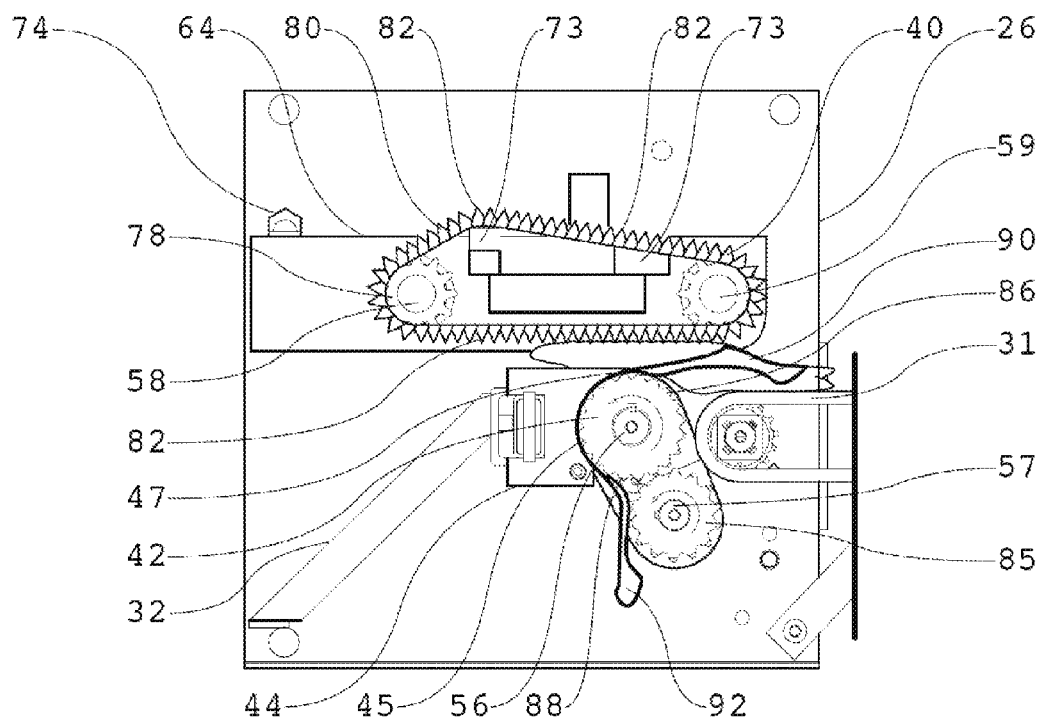
FIG. 3 is a cutaway enlarged side view illustrating the embodiment of FIG. 1 with a piece of poultry product being skinned by the skinning apparatus.

The pinch block 44 includes an arcuate surface 45 disposed in an adjacent, close tolerance relationship to the arcuate path defined by the rotation of the outer surfaces 88 of the fins 86 of the gripper 42. The upper end of the arcuate surface 45 closely mates with the end of each fin 88 as it approaches the pinch block 44. Referring to FIG. 3, a piece of poultry 90 engaged by the belt 40 and the outer ends 88 of the fins 86 is carried toward the opening between the upper end of the arcuate surface 45 and the outer ends 88 of the fins 86. The outer end 88 of each fin 86 engages the poultry product 90, and, approaching this opening, cooperates with a lip 47 defining the upper end of the arcuate surface 45, to pinch or trap the skin 92 of the poultry product 90 between the outer end 88 and the arcuate surface 45.

As the piece of poultry 90 is carried toward the discharge opening by the combined action of the belt 40 and the gripper 42, which rotate at similar speeds, the outer end 88 of each fin 86 continues to pull the point of engagement with the skin 92 downwardly against the arcuate surface 45. In the more preferred embodiment shown, each successive fin 86 engages a spaced point of contact with the skin 92 of the piece of poultry 90 in a similar manner relative to a forwardly moving adjacent fin. With this continuous pulling by successive fins 86, the skin 92 is continuously pulled from the poultry section 90 in one piece without cutting, tearing or ripping of the skin 92. If the skin 92 is torn or ripped significantly by the engagement of the fins 86 with the belt 40 or the initial engagement with the pinch block 44, strips or large areas of skin are likely to remain adhered to the underlying muscle and require undesirable subsequent manual removal. Thus, such tearing is to be avoided if possible.

The outer ends 88 of the gripper 42, which ends engage and trap the skin 92 against the arcuate surface 45, continue to pull portions of skin 92 downwardly along the arcuate surface 45 as the poultry piece 90 is engaged by the gripper 42 and the belt 40. The poultry product 90 continues to move toward the discharge opening and the chute 32, and, when the poultry product 90 is completely skinned by the apparatus, the poultry product 90 falls down the chute 32 under the force of gravity.

The skin 92 of the poultry product, however, continues to be pulled downwardly, toward the lower apex of the gripper 42. In some cases, the skin falls from the gripper 42 under the force of gravity once the skin is no longer sufficiently held between the pinch block 44 and the gripper 42. In other cases, the skin will remain stuck to the fins 86 of the gripper 42, in which case the skin must be removed from the gripper 42 by other means before the skin is carried back toward the top of the gripper 42 where it could interfere with the skinning of other poultry products. It is in this context that the cleaning roller 85 provides substantial advantages over the skinning apparatus described in U.S. Pat. No. 6,264,542, referenced above.

Referring to FIGS. 2 and 3, the cleaning roller 85 is substantially identical in construction to the gripper 42, but has a smaller diameter. Like the gripper 42, the cleaning roller 85 is generally cylindrical with a plurality of radially-projecting fins 87. The cleaning roller 85 is rotatably mounted to the sidewall 26 of the skinning apparatus on a drive shaft 57 at a position below and slightly forward of the gripper 42, with the tips of the fins 87 in a close clearance relationship with the tips of the fins 86 of the gripper. The axis of rotation of the cleaning roller 85 is substantially parallel to the axis of rotation of the gripper 42. The cleaning roller can be rotated by the same motor that drives the belt 40 or the gripper 42, or it can be rotated by a separate motor. The cleaning roller 85 rotates in the same (counterclockwise in FIGS. 2 and 3) direction as the gripper 42 but at a significantly greater speed (at the tips), and therefore it will become apparent that if the cleaning roller 85 is driven by the same motor as the gripper 42, the gearing will have to be modified compared to the gripper 42 to accomplish this greater speed of rotation. Thus, as the skin 92 of the poultry product 90 exits the pinch block 44 and is pulled down and forward by the fins 86 on the lower left quadrant of the gripper 42, the skin 92 is transferred to the fins 87 on the upper left quadrant of the cleaning roller 85, which rotate in a down and rearward direction. The skin 92 is thereby scraped and pulled off of the fins 86 of the gripper 42 by the fins 87 of the cleaning roller 85. The skin 92 is then ejected in a downward direction from the rapidly rotating fins 87 cleaning roller 85, which rotates faster and produces greater centrifugal force than the larger diameter gripper 42.

A water manifold (not shown) sprays water onto the fins 86 of the gripper 42 to assist in the removal of skin and waste matter therefrom. However, due to the primary cleaning function performed by the cleaning roller 85, a much lower water pressure, and therefore a greatly reduced quantity of water, is required relative to previous embodiments of the skinning apparatus that lacked the cleaning roller 85 and that instead relied on water spray as a primary cleaning means. Specifically, the water spray of the present invention is preferably disbursed at about 40 psi at a rate of about 0.75 gallons per minute (GPM). The cleaning roller 85 therefore allows the skinning apparatus to be operated cleanly and efficiently with a substantial savings of water.

Figure 4:
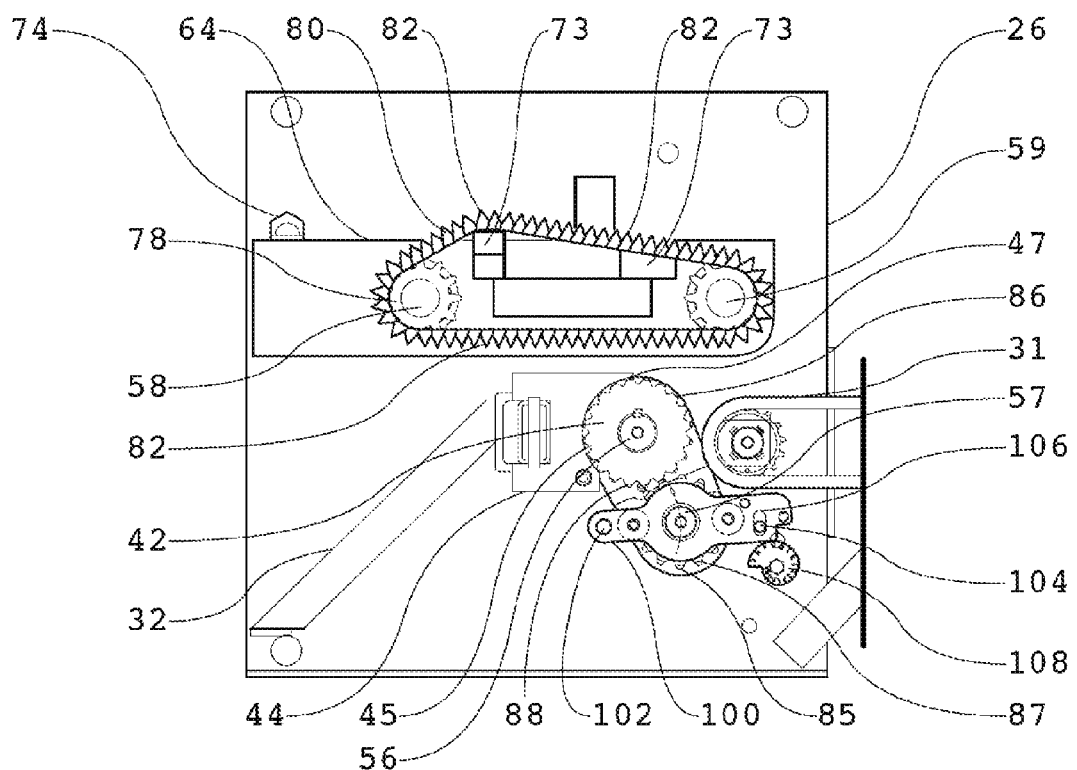
FIG. 4 is a cutaway enlarged side view illustrating a first alternative embodiment of the present invention.

Referring to FIG. 4, an alternative embodiment of the skinning apparatus is shown wherein the cleaning roller 85 and its drive shaft 57 are rotatably mounted to a movable adjustment bracket 100. The adjustment bracket 100 is pivotably mounted at a first horizontal end to the sidewall 26 of the skinning apparatus by a pivot pin 102. A support pin 104 extends from the sidewall 26 through a vertically-elongated adjustment slot 106 in the adjustment bracket 100 at a second, opposite horizontal end, which is preferably the forward end. The cleaning roller 85 and its drive shaft 57 can thereby pivot about the axis of the pivot pin 102, with such movement being limited by engagement between the support pin 104 and the edge of the adjustment slot 106.

An adjustment cam 108 is rotatably mounted to the skinning apparatus 10 by a pivot pin mounted in the sidewall 26 below the forward end of the adjustment bracket 100 with the adjustment cam 108 engaging a bottom edge of the adjustment bracket 100. Rotating the adjustment cam 108 causes the forward end of the adjustment bracket 100 to be pivoted upwardly or downwardly about the pivot pin 102 depending on whether the portion of the adjustment cam 108 that engages the adjustment bracket 100 is an increased or a decreased distance from the pivot pin, thereby moving the cleaning roller 85 nearer or farther away from the gripper 42. The adjustment cam 108 is preferably coupled to a conventional ratcheting mechanism (not within view) that allows the adjustment cam 108 to be incrementally rotated in a clockwise direction while preventing the adjustment cam 108 from being rotated in a counterclockwise direction.

The fins 86 of the gripper 42 experience wear and slowly shorten during regular operation of the skinning apparatus. The overall diameter of the gripper 42 therefore decreases over time. Similar wear is possible on the cleaning roller 85. As this shortening occurs, the gap between the fins 86 of the gripper 42 and the fins 87 of the cleaning roller 85 increases, thereby degrading the ability of the cleaning roller 85 to engage and remove skin from the gripper 42. In order to account for the accumulation of wear on the gripper 42 and maintain the close clearance relationship between the fins 86 of the gripper 42 and the fins 87 of the cleaning roller 85, an operator can simply rotate the adjustment cam 108 on a periodic basis to incrementally move the cleaning roller 85 closer to the gripper 42. The performance of the cleaning roller 85 can thereby be preserved until it eventually becomes necessary to replace the gripper 42.

Figure 5:
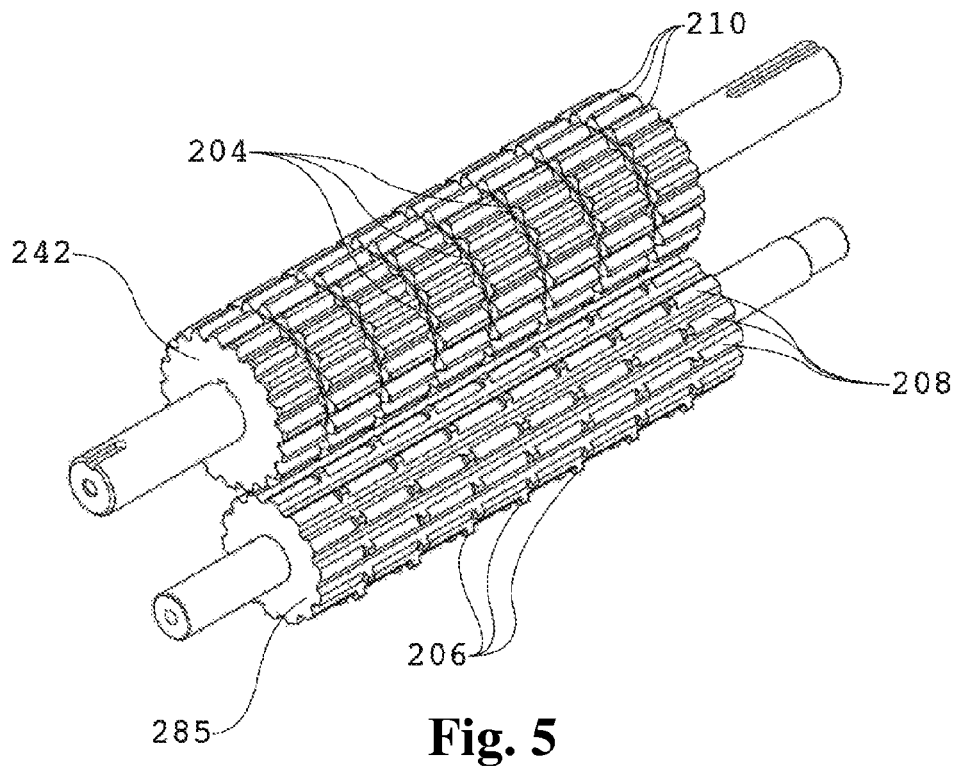
FIG. 5 is a perspective view illustrating the gripper and the cleaning roller of a second alternative embodiment of the present invention.

Referring now to FIG. 5, an alternative gripper 242 and cleaning roller 285 are contemplated for facilitating the removal of poultry skin and other waste matter from the gripper 242 without the use of any water. The gripper 242 and cleaning roller 285 are installed in the skinning station 38 in a substantially identical manner to the gripper 42 and cleaning roller 85 described above and differ in structure therefrom in the following respects. The gripper 242 has a series of longitudinally-spaced, annular grooves 204 formed in it. The cleaning roller 285 has a series of complementary, radially protruding and longitudinally-spaced teeth 206 that project from each of its fins 208. The longitudinal space between each tooth 206 and each immediately adjacent tooth 206 on the cleaning roller 285 is substantially equal to the longitudinal space between each pair of longitudinally-adjacent annular grooves 204 in the gripper 242. Thus, the teeth 206 and the grooves 204 matingly engage.

During operation, the teeth 206 of the cleaning roller 285 extend into and rotate through the annular grooves 204 in the gripper 242. The teeth 206 thereby dig and pull substantially all skin and waste matter from the fins 210 of the gripper 242. The skin and waste matter are then rapidly ejected from the cleaning roller 285 by centrifugal force in the manner described above. The grooved gripper 242 and toothed cleaning roller 285 thereby allow the skinning apparatus 10 to be operated without requiring any additional cleaning means such as water spray. The gripper 242 and cleaning roller 285 are shown as having six annular grooves 204 and six longitudinally-spaced rings of teeth 206, respectively, although it is contemplated that a fewer or greater number of annular grooves 204 and corresponding rings of teeth 206 can be used without departing from the present invention.

Referring back to FIG. 3, by controlling the downward pressure that is applied by the belt 40 to the piece of poultry 90 against the gripper 42 and the opening to the arcuate surface 45 of the pinch block 44, gripping of the outer skin 92 is accomplished with very little or no damage to the underlying meat portions. This results in a very high percentage of the processed poultry pieces having the whole skin removed in substantially one piece, increasing production rates and decreasing loss of muscle product compared to the prior art.

Although the gripper 42 is shown in FIG. 2 with 20 fins 86, the number of fins can be varied by replacing the gripper 42 with another gripper of similar outer diameter and length. Varying the number of the fins, which varies the size of the fins and the voids between the fins, varies the amount of fat removed with the skin from the poultry section. The more fins there are, the less fat that is removed from the poultry product, and therefore the larger the fat layer that remains on the poultry product. Thus, if one desires a very thin layer of fat remaining on the poultry, one can replace the gripper 42, which has 20 fins, with a gripper having 22 or 24 fins, or flights. Of course, one can alternatively make grippers with 18, 16, 14, 12, 10, 8, 6 or even 4 fins, although this is generally not desirable. The desired range of fins is between about 8 and about 30 fins.

In view of the foregoing description herein, it should be readily understood that the present invention provides an improved apparatus and method for removing the skin from poultry product pieces that improves yield and is of relatively simple construction and efficient in operation.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved automated poultry product skinning apparatus including a support frame having a product feed inlet and a product discharge outlet, a conveyor mounted to the support frame and aligned to engage the upper surface of a piece of poultry product delivered to the feed inlet and direct the poultry product in a path toward the discharge outlet, the conveyor being mounted to the frame for selected vertical movement of at least a forward end of the conveyor in response to the size of the piece of poultry product delivered to the feed inlet, a gripper rotatably mounted to the frame and having a plurality of radially extending fins having outer ends disposed below the conveyor for engaging a lower side of the poultry product passing between the gripper and the conveyor, and a pinch block mounted on the frame and including an arcuate surface fixedly positioned in close clearance relationship to an arcuate path of the outer end of the fins during a portion of their rotation to define an opening configured to engage the outer skin attached to the poultry product between the outer ends of the fins and the arcuate surface of the pinch block, wherein the close clearance relationship and the opening are configured to firmly entrap the attached outer skin between the outer end of each of the fins and the arcuate surface of the pinch block to pull the outer skin from its attachment to the underlying meat portions of the poultry product, the improvement comprising:

a. a cleaning roller rotatably mounted adjacent the gripper and having a plurality of radially extending fins with outer ends disposed in a close clearance relationship with the outer ends of the fins of the gripper for engaging and removing poultry skin and waste matter therefrom when the roller is rotatably driven in the same direction as the gripper; and b. an adjustment bracket pivotably mounted to the support frame and an adjustment cam rotatably mounted to the support frame below and in engagement with the adjustment bracket, wherein the cleaning roller is rotatably mounted to the adjustment bracket and rotation of the adjustment cam in a first direction moves the outer ends of the fins of the cleaning roller nearer the outer ends of the fins of the gripper.

2. The improved automated poultry product skinning apparatus in accordance with claim 1, wherein the cleaning roller is configured to rotate more rapidly than the gripper.

3. The improved automated poultry product skinning apparatus in accordance with claim 1, wherein the axis of rotation of the cleaning roller is parallel to the axis of rotation of the gripper.

4. The improved automated poultry product skinning apparatus in accordance with claim 1, wherein the cleaning roller and the gripper are both generally cylindrical in shape.

5. An improved automated poultry product skinning apparatus including a support frame having a product feed inlet and a product discharge outlet, a conveyor mounted to the support frame and aligned to engage the upper surface of a piece of poultry product delivered to the feed inlet and direct the poultry product in a path toward the discharge outlet, the conveyor being mounted to the frame for selected vertical movement of at least a forward end of the conveyor in response to the size of the piece of poultry product delivered to the feed inlet, a gripper rotatably mounted to the frame and having a plurality of radially extending fins having outer ends disposed below the conveyor for engaging a lower side of the poultry product passing between the gripper and the conveyor, and a pinch block mounted on the frame and including an arcuate surface fixedly positioned in close clearance relationship to an arcuate path of the outer end of the fins during a portion of their rotation to define an opening configured to engage the outer skin attached to the poultry product between the outer ends of the fins and the arcuate surface of the pinch block, wherein the close clearance relationship and the opening are configured to firmly entrap the attached outer skin between the outer end of each of the fins and the arcuate surface of the pinch block to pull the outer skin from its attachment to the underlying meat portions of the poultry product, the improvement comprising:

a. a cleaning roller rotatably mounted adjacent the gripper and having a plurality of radially extending fins with outer ends disposed in a close clearance relationship with the outer ends of the fins of the gripper for engaging and removing poultry skin and waste matter therefrom when the roller is rotatably driven in the same direction as the gripper; and b. a plurality of longitudinally-spaced annular grooves formed in the gripper and a plurality of longitudinally-spaced teeth projecting from the fins of the cleaning roller, wherein the teeth of the cleaning roller extend into and rotate through the grooves of the gripper during operation of the skinning apparatus.

* * * * *